(12) United States Patent
Park

(10) Patent No.: US 9,732,914 B2
(45) Date of Patent: Aug. 15, 2017

(54) LED LAMP

(71) Applicants: KUMHO ELECTRIC INC., Seoul (KR); Myung Koo Park, Seoul (KR)

(72) Inventor: Myung Koo Park, Seoul (KR)

(73) Assignees: KUMHO ELECTRIC INC., Seoul (KR); Myung Koo Park, Seoul (KR)

( * ) Notice: Subject to any disclaimer, the term of this patent is extended or adjusted under 35 U.S.C. 154(b) by 101 days.

(21) Appl. No.: 14/966,362

(22) Filed: Dec. 11, 2015

(65) Prior Publication Data

US 2017/0097124 A1 Apr. 6, 2017

(30) Foreign Application Priority Data

Oct. 5, 2015 (KR) .................. 10-2015-0139518

(51) Int. Cl.
*F21K 9/27* (2016.01)
*H05B 33/08* (2006.01)

(52) U.S. Cl.
CPC ............. *F21K 9/27* (2016.08); *H05B 33/083* (2013.01); *H05B 33/0845* (2013.01); *H05B 33/0884* (2013.01); *H05B 33/0809* (2013.01)

(58) Field of Classification Search
CPC ......... F21K 9/27; F21K 9/00; H05B 33/0884; Y10S 315/05; Y10S 315/02
USPC .... 315/247, 224, 225, 185 S, 291, 307–326, 315/227 R, 231, 235, 238, 240, 355
See application file for complete search history.

(56) References Cited

U.S. PATENT DOCUMENTS

| 8,987,998 | B2* | 3/2015 | Park | H05B 33/0809 |
| | | | | 315/185 R |
| 2015/0252955 | A1* | 9/2015 | Boschetto | F21K 9/1355 |
| | | | | 362/249.02 |
| 2016/0113098 | A1* | 4/2016 | Han | H05B 39/00 |
| | | | | 315/187 |
| 2016/0329834 | A1* | 11/2016 | Sugiyama | H02M 7/487 |

* cited by examiner

*Primary Examiner* — Tuyet Vo
(74) *Attorney, Agent, or Firm* — Rabin & Berdo, P.C.

(57) ABSTRACT

Provided is a Light Emitting Diode (LED) lamp. The LED lamp includes: four external connection pins including at least two connection pins connected to a ballast stabilizer for a fluorescent lamp; an LED array in which a plurality of LEDs are connected in series; and at least a pair of capacitors formed between the LED array and the external connection pin, wherein in each of the at least a pair of capacitors, two polarized capacitors are connected in series with a back-to-back method.

11 Claims, 6 Drawing Sheets

LED LAMP

CROSS-REFERENCE(S) TO RELATED APPLICATION

This application claims priority of Korean Patent Application No. 10-2015-0139518, filed on Oct. 5, 2015, in the Korean Intellectual Property Office, which is hereby incorporated by reference in its entirety.

BACKGROUND OF THE INVENTION

Field of the Invention

The present invention relates to a Light Emitting Diode (LED) lamp, and more particularly, to an LED lamp connected to a ballast stabilizer for fluorescent light to be driven regardless of a kind of a ballast stabilizer for fluorescent light.

Description of the Related Art

With the development of technology, light efficiency of an LED used only for small power instruction light in the past has been improved to use in an actual life. Further, as an environmentally-friendly light source that does not contain mercury unlike other light sources, an LED has been spotlighted as a next generation light source for backlight for a mobile terminal, backlight for an LCD TV, a vehicle lamp, and general lighting. Accordingly, for past 100 years, an incandescent lamp or fluorescent light that has been used as a main light source of lighting has been replaced with an LED lamp.

However, when an LED lamp is used instead of an incandescent lamp, an E26 base lamp may be used, but when an LED lamp is used instead of fluorescent light that has been mainly used as general lighting, a lamp device should be changed or an exclusive ballast stabilizer should be separately installed. Accordingly, there is a problem that should replace a wiring within the lamp device and thus an LED lamp for fluorescent light has not been widely spread.

SUMMARY OF THE INVENTION

An aspect of the present invention is to provide an LED lamp connected to a conventional ballast stabilizer for fluorescent light to be driven regardless of a kind of a conventional ballast stabilizer for fluorescent light.

According to an embodiment of the present invention, an LED lamp includes: four external connection pins including at least two connection pins connected to a ballast stabilizer for a fluorescent lamp; an LED array in which a plurality of LEDs are connected in series; and at least a pair of capacitors formed between the LED array and the external connection pin, wherein in each of the at least a pair of capacitors, two polarized capacitors are connected in series with a back-to-back method.

According to the present invention, an LED fluorescent lamp that can use an existing ballast stabilizer for fluorescent light without installation of a separate exclusive ballast stabilizer or change of a wiring within a light device is provided. Therefore, high efficiency of LED lighting that replaces existing fluorescent light without a particular change of a conventional ballast stabilizer for fluorescent light can be used.

BRIEF DESCRIPTION OF THE DRAWINGS

The above and other aspects, features and advantages of certain exemplary embodiments of the present invention will be more apparent from the following description taken in conjunction with the accompanying drawings, in which.

DETAILED DESCRIPTION OF EXEMPLARY EMBODIMENTS

Figure 1:
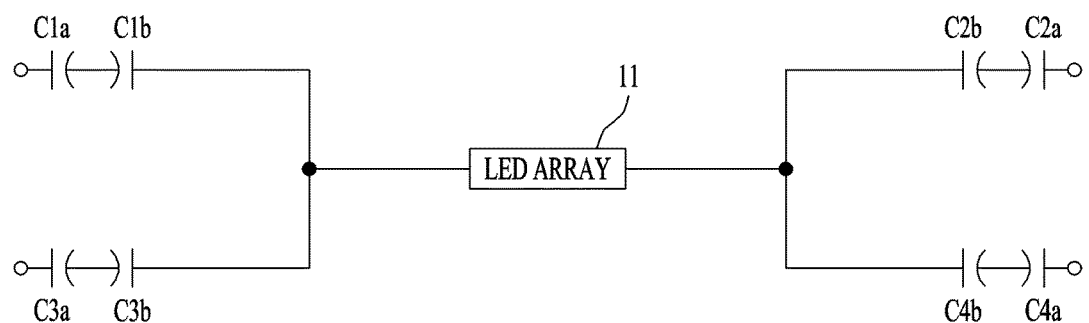
FIG. 1 is a circuit diagram of an LED lamp according to an exemplary embodiment of the present invention.

Exemplary embodiments of the present invention will be described below in detail with reference to the accompanying drawings. Wherever possible, the same reference numerals will be used to refer to the same elements throughout the specification, and a duplicated description thereof will be omitted. It will be understood that although the terms "first", "second", etc. are used herein to describe various elements, these elements should not be limited by these terms. These terms are only used to distinguish one element from another element.

FIG. 1 is a circuit diagram of an LED lamp according to an exemplary embodiment of the present invention.

Referring to FIG. 1, an LED lamp 100 according to the present exemplary embodiment includes an LED array 11 and capacitor pairs (C1a and C1b, C2a and C2b, C3a and C3b, and C4a and C4b), which are a capacitive element and may have first to fourth connection pins, which are external connection pins.

The LED array 11 has a structure in which a plurality of LEDs are connected in series, and at least two arrays connected in series may be connected in parallel. Even in an LED lamp according to another exemplary embodiment to be described hereinafter, an LED array has a structure in which a plurality of LEDs are connected in series, and at least two arrays connected in series may be connected in parallel.

In the present exemplary embodiment, in four pair of capacitors connected to first to fourth external connection pins, capacitors having the polarity may be connected in series with a back-to-back method. In the present exemplary embodiment, capacitance of the capacitor formed between the LED array 11 and the external connection pin may be formed in a large magnitude. In the present exemplary embodiment, capacitance of a pair of capacitors may be about 1 μF-100 μF. When a large magnitude of capacitance of 1 μF-100 μF is implemented with a non-polar capacitor, a physical size of the capacitor largely increases and thus a weight of an entire LED product and a production cost thereof increase. In the present exemplary embodiment, by connecting a pair of capacitors having the polarity with a back-to-back method, the polarity is removed and while having a large magnitude of capacitance, a physical size of the capacitor can be reduced.

At the inside of a presently using instant lighting method of electronic ballast stabilizer for a fluorescent lamp, a capacitance value of a capacitor for controlling a main current is approximately 0.0015-0.0068 µF according to a capacity of the fluorescent lamp. As in the present exemplary embodiment, in the capacitors C1a-C4b connected to the external connection pin, when a large magnitude (about 1 µF-100 µF) of capacitance is used, capacitance within the LED lamp is relatively much larger than a main current control capacitance (C1 of FIG. 3) within an electronic ballast stabilizer and thus impedance of the capacitors C1a-C4b within the LED lamp is small enough to ignore. Therefore, in an entire circuit connected to an electronic ballast stabilizer of a high frequency (50 kHz-100 kHz), because the large quantity of capacitor is in an almost short state, in an entire circuit in which the ballast stabilizer and the LED array are connected, the capacitor pair may have no influence on impedance. Therefore, a current flowing to the LED array 11 of the LED lamp 100 may be controlled by a capacity of a main current control capacitor. However, in a low frequency such as a frequency (50 Hz/60 Hz) of a general power source used for a rapid start method of magnetic ballast stabilizer, impedance by a capacitance capacity of about tens of µF has an influence on impedance of an entire connection circuit of a ballast stabilizer and an LED array and thus an LED current flowing to the LED array 11 of the LED lamp 100 may be randomly controlled by changing a capacity value of internal capacitors C1a-C4b. Therefore, by appropriately selecting a value of capacitors C1a-C4b for controlling a current, the capacitors C1a-C4b may be used to both an electronic ballast stabilizer and a magnetic ballast stabilizer with one circuit configuration without a change of a circuit configuration of other LED lamps.

In the present exemplary embodiment, a back-to-back capacitor is connected to each of four connection pins formed in an LED lamp, but a capacitor pair may be connected to at least one connection pin of the four connection pins. Further, the capacitor pair may be replaced with a non-polar capacitor or a plurality of non-polar capacitors.

Figure 2:
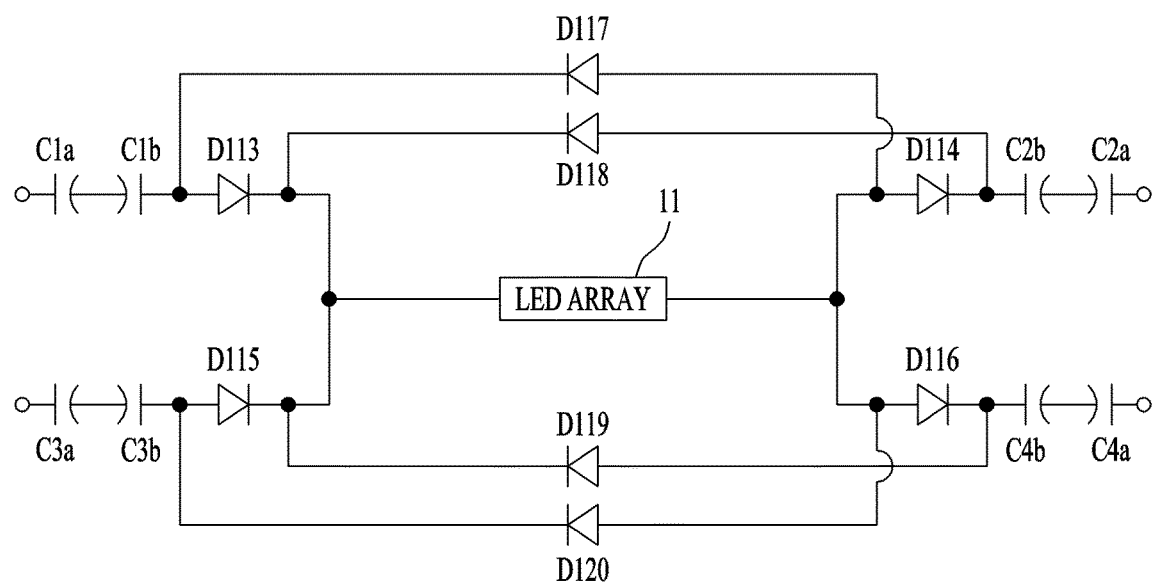
FIG. 2 is a circuit diagram of an LED lamp according to another exemplary embodiment of the present invention.

FIG. 2 is a circuit diagram of an LED lamp 200 according to another exemplary embodiment of the present invention.

An exemplary embodiment of FIG. 2 is different from an exemplary embodiment of FIG. 1 in that a plurality of diodes D113-D120 are added and thus such a difference will be described.

According to the present exemplary embodiment, the plurality of diodes D113-D120 may form a full wave rectifier circuit so that an LED array 11 operates in an AC current injected into the LED lamp 200. Further, even if any pin of external connection pins formed in the LED lamp 200 is connected to a power source line or a ballast stabilizer terminal, the plurality of diodes D113-D120 may be symmetrically formed so that the LED lamp 200 normally operates. In the present exemplary embodiment, for a normal operation of the LED lamp 200, a form in which 8 diodes are symmetrically formed is illustrated, but only some of the diodes may be formed. For example, even if only D113, D114, D117, and D118 are formed, in an AC current input to a first connection pin and a second connection pin, an LED array may be normally operated. Further, even if only D115, D116, D119, and D120 are formed, in an AC current input to a third connection pin and a fourth connection pin, an LED array may be normally operated. Further, because the LED lamp 200 according to the present exemplary embodiment is formed to perform a complete symmetry operation without the polarity, even when AC power is input to the first connection pin and the fourth connection pin and even when AC power is input to the second connection pin and the third connection pin, the LED lamp 200 may perform the same operation.

In an electronic fluorescent light ballast stabilizer, according to a production company, there is a product designed to detect a short circuit of a filament of a fluorescent lamp, to determine whether the lamp is in an abnormal state, and to operate a protection circuit, if the lamp is in an abnormal state. In such a case, although not clearly shown in the drawings, a resistor or an inductor may be additionally connected between external connection pins with a band of a filament. For example, between a first connection pin to which a first capacitor pair are connected and a third connection pin to which a third capacitor pair are connected, and between a second connection pin to which a second capacitor pair are connected and a fourth connection pin to which a fourth capacitor pair are connected, each resistor or inductor may be connected.

Further, when an abnormal state, such as a case in which an excessive current flows to the LED array 11 within the LED lamp 200, occurs, in order to detect the abnormal state and to protect the LED lamp 200, at least one protection fuse may be further formed between the first connection pin to the fourth connection pin and a first capacitor pair to a fourth capacitor pair connected thereto.

In the present exemplary embodiment, capacitance of each of a pair of capacitors is set to 22 µF and thus capacitance of a pair of capacitors connected in series with a back-to-back method becomes about 11 µF. Table 1 represents that an LED array normally operates when connecting an LED lamp formed in each of connection pins to various ballast stabilizers in a capacitor in which each capacitance is 22 µF in an exemplary embodiment of FIG. 2. As can be seen in Table 1, in presently available various kinds of ballast stabilizers for fluorescent light, it can be determined that an LED lamp according to an exemplary embodiment of the present invention normally operates.

TABLE 1

| Type of ballast stabilizer | Production company | Model | Type | Input Voltage [Vac] | Input Current [A] | PF | Input power [W] |
|---|---|---|---|---|---|---|---|
| Electronic instant start ballast stabilizer | Osram Sylvania | QTP 2x32T8/UNV ISN-SC | T8 | 120 | 0.3140 | 0.9989 | 37.9 |
| | Howard Industries | EP2/59IS/MV/SC | T8 | 120 | 0.3862 | 0.9990 | 46.9 |
| | GE | GE232MAX347-L | T8 | 120 | 0.1487 | 0.9981 | 32.8 |

TABLE 1-continued

| Type of ballast stabilizer | Production company | Model | Type | Input Voltage [Vac] | Input Current [A] | PF | Input power [W] |
|---|---|---|---|---|---|---|---|
| | Universal | B232I120L-A | T8 | 120 | 0.3169 | 0.9813 | 37.8 |
| | | B232IUNVEL-A | T8 | 120 | 0.2691 | 0.9978 | 32.7 |
| | GreenHill | GH2P32ISUNV | T8 | 120 | 0.3460 | 0.9989 | 41.8 |
| Electronic rapid start ballast stabilizer | Howard Industries | EP2/32PRS/ MV/MC/HE | T8 | 120 | 0.3350 | 0.9985 | 40.5 |
| | Universal | B232PUNVHP-A | T8 | 120 | 0.3172 | 0.9988 | 38.3 |
| Magnetic rapid start ballast stabilizer | Osram Sylvania | MB2x40/120 RS | T12 | 120 | 0.4351 | 0.8486 | 44.5 |
| | GE | GEM240HRS120 | T12 | 120 | 0.3584 | 0.9064 | 39.2 |
| | Halco | M24RS/120 | T12 | 120 | 0.4101 | 0.8684 | 42.9 |

Figure 3:
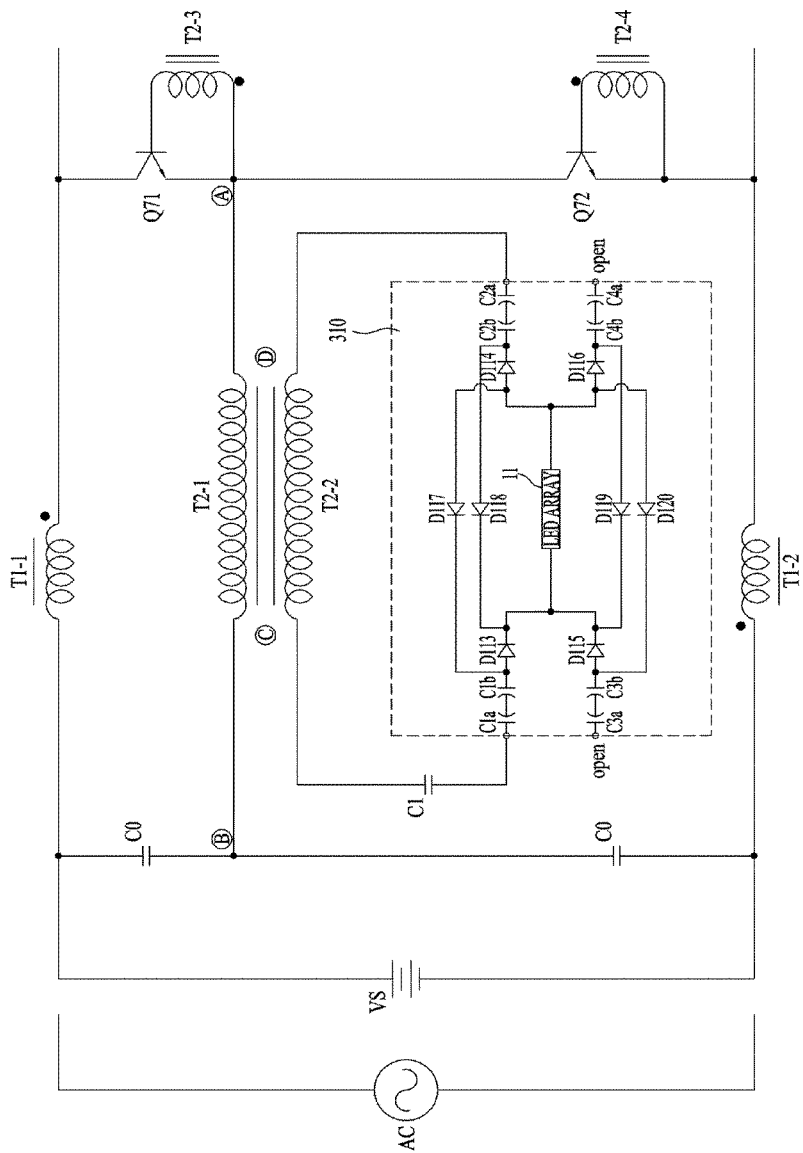
FIG. 3 is a circuit diagram illustrating a state in which an LED lamp is connected to a first form of electronic ballast stabilizer according to an exemplary embodiment of the present invention.

FIG. 3 is a diagram illustrating a circuit configuration when using an LED lamp 310 in a first form of electronic ballast stabilizer (instant start method) for fluorescent light according to an exemplary embodiment of the present invention. Referring to FIG. 3, in a second form of electronic ballast stabilizer for fluorescent light, Q71 and Q72 of a switching element maintain a switching operation by a self-oscillation operation of a circuit formed with transformers T1 and T2 and a capacitor C1, an output of a switching point A is in a short-circuit state in AC and is ½ Vs in DC, and a first winding T2-1 of a transformer T2 is connected to a point B, which is the center of a capacitor C0 connected in series, a fluorescent lamp is initially discharged with a high voltage induced to a secondary winding T2-2 of the transformer T2, and after discharge is performed, a stabilizing lamp current is controlled by a capacitor C1 connected in series to a lamp load.

When using an electronic ballast stabilizer for fluorescent light of this method, in a basic operation, the transformer T2 induces a high frequency of AC voltage to the secondary winding T2-2 by self-oscillation, and when a point C is in a positive (+) potential based on a point D, a current flows to a path of the point C-C1-C1a-C1b-D113-LED array-D114-C2b-C2a-point D. When the point C is in a negative (−) potential, a current flows to a path of a point D-C2a-C2b-D118-LED array-D117-C1b-C1a-C1-point C. Therefore, a current value flowing to an LED array 11 may be controlled by a current control capacitor C1 within the electronic ballast stabilizer and serial complex impedance of C1a, C1b, C2b, and C2a within the LED lamp 310. In the present exemplary embodiment, capacitance of C1a, C1b, C2b, and C2a is relatively much larger than capacitance of C1 and a current flowing the ballast stabilizer is a high frequency (50 kHz-100 kHz) and thus complex impedance in entire serial connection is almost determined by capacitance of C1, and C1a, C1b, C2b, and C2a are viewed as almost short-circuited.

Figure 4:
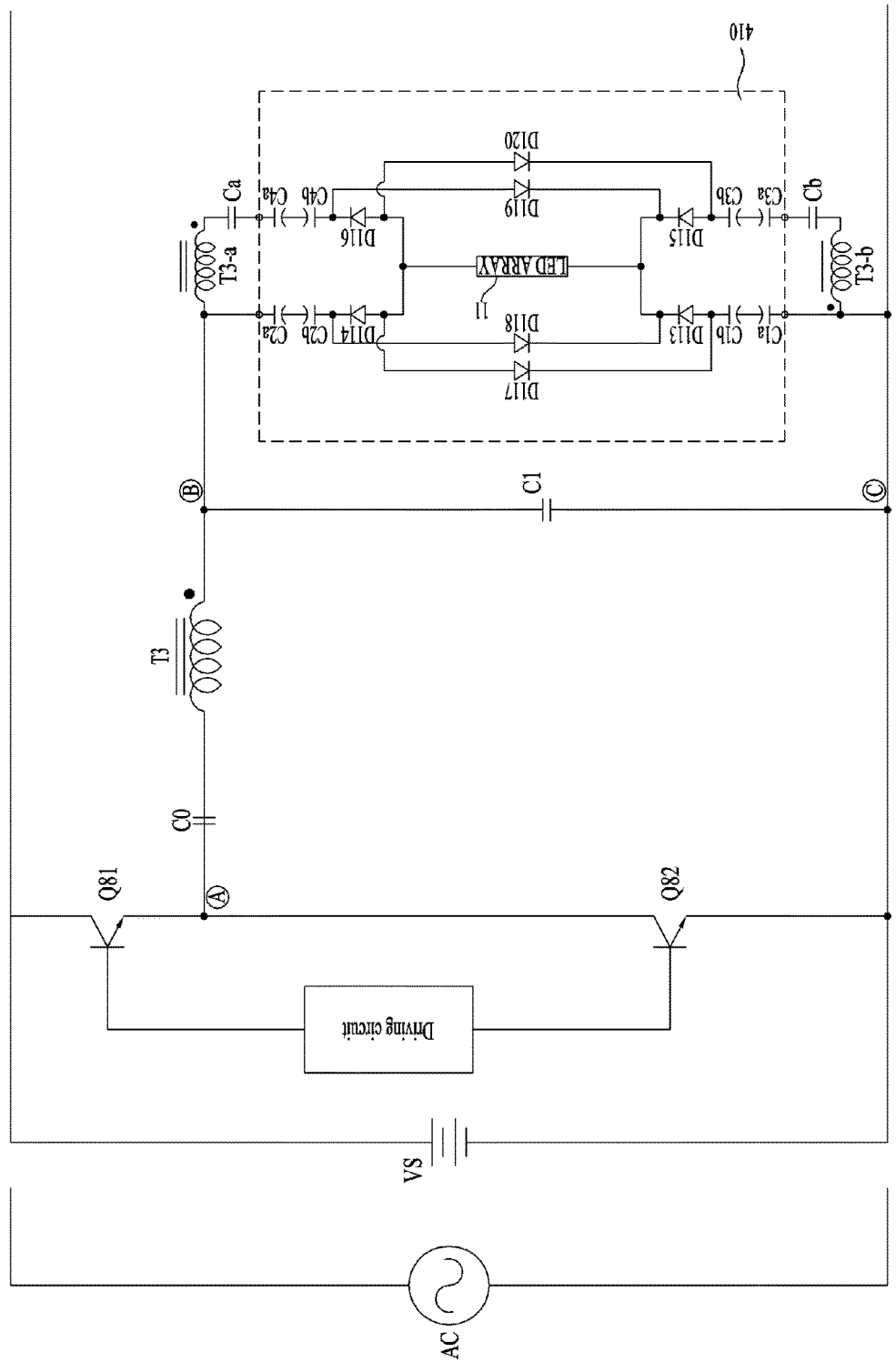
FIG. 4 is a circuit diagram illustrating a state in which an LED lamp is connected to a second form of electronic ballast stabilizer according to an exemplary embodiment of the present invention.

FIG. 4 is a diagram illustrating a circuit configuration in which an LED lamp 410 is used in a second form of electronic ballast stabilizer for fluorescent light according to an exemplary embodiment of the present invention. Such a method of electronic ballast stabilizer has a configuration of connecting a serial resonant circuit formed with an inductor T3 and a capacitor C1 to a point A, which is a switching point of switching elements Q81 and Q82 and connecting one lamp or a plurality of lamps to both ends of the resonant capacitor C1, and in a basic operation, a serial resonant circuit is formed to correspond to the operation frequency with the inductor T3 and the capacitor C1 at the output point A of a half bridge method of inverter formed with the switching elements Q81 and Q82 operating with a frequency fixed by a separately excited driving circuit, and after initially lighting fluorescent light with an initial serial resonant voltage applied to both ends of the capacitor, a current of a fluorescent lamp is controlled by the inductor T3. However, in this method, in order to maximize a life-span of a fluorescent lamp, by minimizing oxide scattering of a lamp filament when lighting with a method of applying a high voltage to the lamp 410 after fully preliminarily heating a filament of a fluorescent lamp with a secondary voltage occurring in the preliminarily heating winding upon initial lighting of the lamp 410 by winding secondary preliminarily heating windings T3-a and T3-b of T3 to a resonant transformer, a life-span of the lamp is maximized.

When using this method, a current flowing to the LED array 11 by the preliminarily heating windings T3-a and T3-b is very minute, and thus when disregarding the current, in a main current flowing to the LED lamp 410, in a cycle in which a potential of a point B is a positive (+) potential, compared with a point C, a current flows to a path of a point B-C2a-C2b-D118-LED array-D117-C1b-C1a-point C, and in a cycle in which a potential of a point B is a negative (−) potential, a current flows to a path of a point C-C1a-C1b-D113-LED array-D114-C2b-C2a-point B. In this case, capacitance of C1a, C1b, C2b, and C2a is relatively very large, compared with capacitance of C1, and a current flowing the ballast stabilizer is a high frequency (50-100 kHz) and thus entire impedance is determined by capacitance of C1 and C1a, C1b, C2b, and C2a are viewed as a short circuit.

Figure 5:
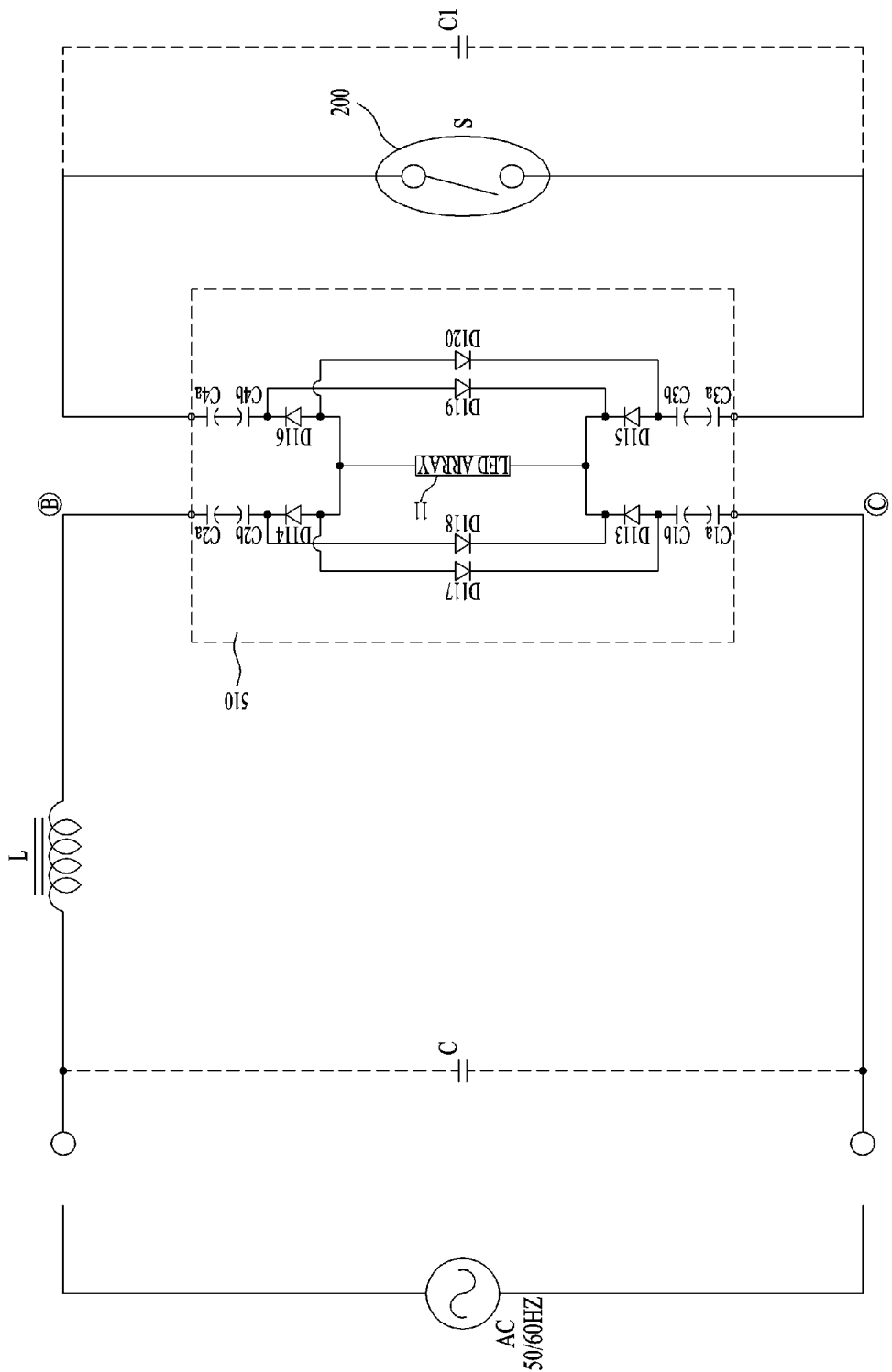
FIG. 5 is a circuit diagram illustrating a state in which an LED lamp is connected to a first form of magnetic ballast stabilizer according to an exemplary embodiment of the present invention.

FIG. 5 is a diagram illustrating a circuit configuration when an LED lamp 510 is used in a first form of magnetic ballast stabilizer for fluorescent light according to an exemplary embodiment of the present invention.

Referring to FIG. 5, when an input voltage is applied, impedance of the LED lamp 510 is not shown as infinity unlike fluorescent light and thus a starter lamp S, 200 may be regarded as an opened state and thus when disregarding the starter lamp S, 200, in a main current path, in a cycle in which a point B is a positive (+) potential based on a point C, a current flows to a path of C2a-C2b-D118-LED array-D117-C1b-C1a, and in a cycle in which a point B is a negative (−) potential, a current flows to a path of C1a-C1b-D113-LED array-D114-C2b-C2a. In this case, a current flowing an LED array 11 represents a form of a pulsating current having a twice frequency 2f of an input power frequency f. Therefore, a flickering phenomenon that may occur when driving an LED fluorescent lamp with a common frequency f can be remarkably reduced.

Figure 6:
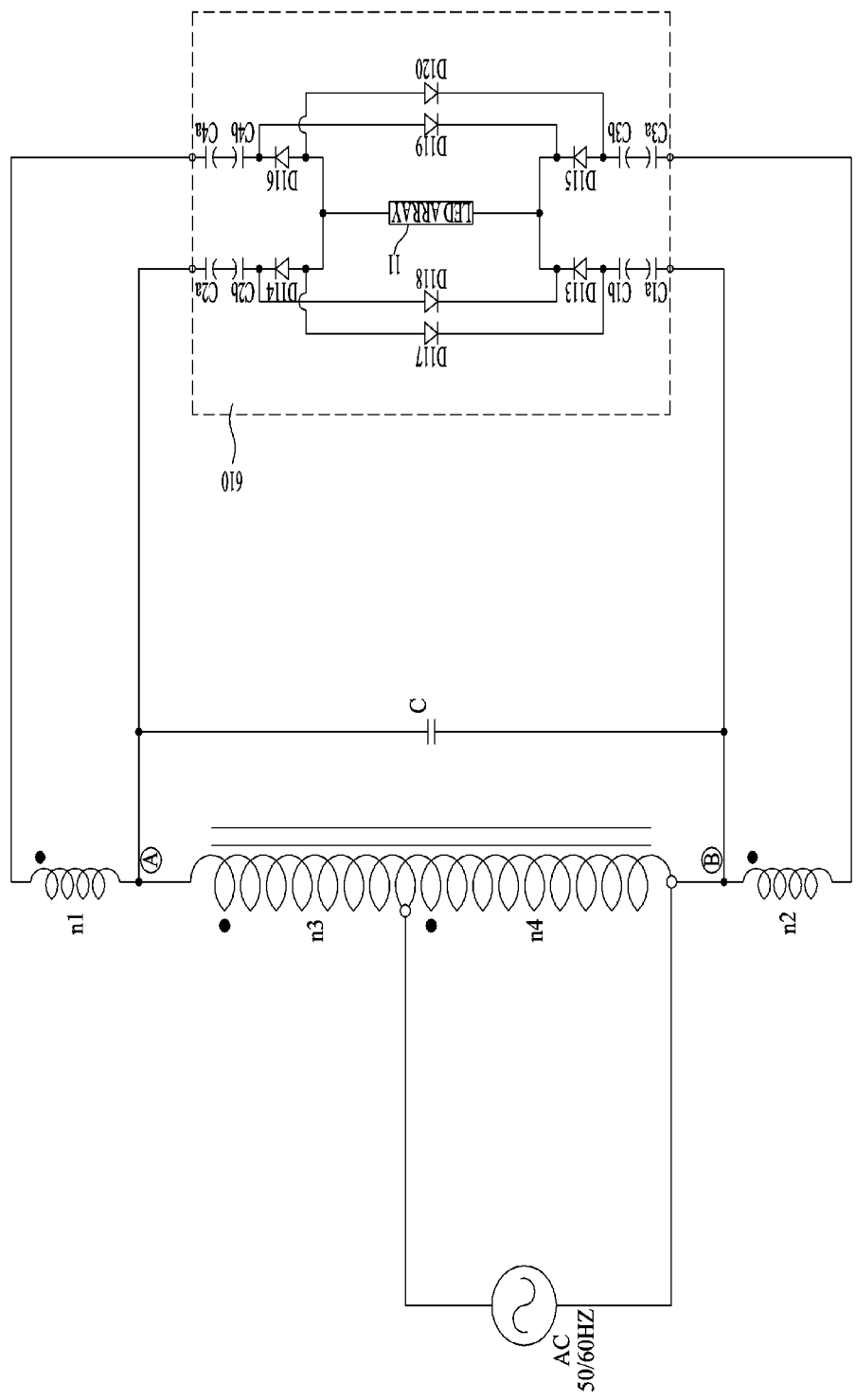
FIG. 6 is a circuit diagram illustrating a state in which an LED lamp is connected to a second form of magnetic ballast stabilizer according to an exemplary embodiment of the present invention.

FIG. 6 is a diagram illustrating a circuit configuration when an LED lamp 610 is used in a second form of magnetic ballast stabilizer for fluorescent light according to an exemplary embodiment of the present invention.

Referring to FIG. 6, when a positive (+) voltage is applied to the A side of a transformer winding based on a point B, if respective voltages applied to preliminarily heating windings n1 and n2 for preliminarily heating a filament of fluorescent light are Vn1 and Vn2, and even in this case, diodes D113 and D115 and diodes D114 and D116 are connected in a backward direction and thus a load is viewed in an opened state, whereby power loss by a preliminarily heating winding may become zero.

In a path of a main current flowing to the LED lamp 610, in a cycle in which a point A is a positive (+) potential based on a point B, a current flows to a complex path of C2a-C2b-D118-LED array 11-D117-C1b-C1a and C4a-C4b-D119 -LED array 11-D120-C3b-C3a, and in a cycle in which a point A is a negative (−) potential, a current flows to a complex path of C1a-C1b-D113-LED array 11-D114-C2b-C2a and C3a-C3b-D115-LED array 11-D116-C4b-C4a.

Even in this case, similar to the magnetic ballast stabilizer of FIG. 5, a current flowing through the LED lamp 610 has a pulsating current form of a twice frequency 2f of an input power frequency f. Therefore, a flickering phenomenon occurring when driving the LED lamp 610 with a common frequency of 50-60 Hz can be remarkably reduced.

In this way, an LED lamp according to an exemplary embodiment of the present invention may be directly mounted and used in a generally using electronic ballast stabilizer and magnetic ballast stabilizer without circuit change. Further, an LED lamp according to an exemplary embodiment of the present invention is not limitedly applied in a configuration and method of the foregoing exemplary embodiments, but in order to variously change the exemplary embodiments, the entire or a portion of respective exemplary embodiments may be selectively combined.

While the invention has been shown and described with reference to exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

DESCRIPTION OF SYMBOLS

11: LED array C1a, C1b: first capacitor pair
C2a, C2b: second capacitor pair C3b, C3b: third capacitor pair
C4a, C4b: fourth capacitor pair

What is claimed is:

1. A Light Emitting Diode (LED) lamp, comprising:
   four external connection pins comprising at least two connection pins connected to a ballast stabilizer for a fluorescent lamp;
   an LED array in which a plurality of LEDs are connected in series; and
   at least a pair of capacitors formed between the LED array and the external connection pin,
   wherein in each of the at least a pair of capacitors, two polarized capacitors are connected in series with a back-to-back method.

2. The LED lamp of claim 1, wherein the polarized capacitors each have capacitance of 1-100 μF.

3. The LED lamp of claim 1, wherein the at least a pair of capacitors comprise:
   a first capacitor pair having one end connected to a first connection pin and the other end connected to an anode terminal of the LED array;
   a second capacitor pair having one end connected to a second connection pin and the other end connected to a cathode terminal of the LED array;
   a third capacitor pair having one end connected to a third connection pin and the other end connected to an anode terminal of the LED array; and
   a fourth capacitor pair having one end connected to a fourth connection pin and the other end connected to a cathode terminal of the LED array.

4. The LED lamp of claim 3, further comprising at least one diode formed between the at least one capacitor pair and the LED array.

5. The LED lamp of claim 4, wherein the at least one diode comprises:
   a first diode connected in series between the first capacitor pair and an anode terminal of the LED array;
   a second diode connected in series between the second capacitor pair and a cathode terminal of the LED array;
   a third diode connected in series between the third capacitor pair and an anode terminal of the LED array; and
   a fourth diode connected in series between the fourth capacitor pair and a cathode terminal of the LED array.

6. The LED lamp of claim 4, wherein the at least one diode comprises:
   a first diode having an anode connected to the other end of the first capacitor pair and a cathode connected to an anode terminal of the LED array;
   a second diode having a cathode connected to the other end of the second capacitor pair and an anode connected to a cathode terminal of the LED array;
   a fifth diode having an anode connected to the anode of the second diode and a cathode connected to the anode of the first diode; and
   a sixth diode having an anode connected to a cathode of the second diode and a cathode connected to the cathode of the first diode.

7. The LED lamp of claim 4, wherein the at least one diode comprises:
   a third diode having an anode connected to the other end of the third capacitor pair and a cathode connected to an anode terminal of the LED array;
   a fourth diode having a cathode connected to the other end of the fourth capacitor pair and an anode connected to a cathode terminal of the LED array;
   a seventh diode having an anode connected to the cathode of the fourth diode and a cathode connected to the cathode of the third diode; and
   an eighth diode having an anode connected to the anode of the fourth diode and a cathode connected to the anode of the third diode.

8. The LED lamp of claim 4, wherein the at least one diode comprises:
   a first diode having an anode connected to the other end of the first capacitor pair and a cathode connected to an anode terminal of the LED array;

a second diode having a cathode connected to the other end of the second capacitor pair and an anode connected to a cathode terminal of the LED array;
a third diode having an anode connected to the other end of the third capacitor pair and a cathode connected to an anode terminal of the LED array;
a fourth diode having a cathode connected to the other end of the fourth capacitor pair and an anode connected to a cathode terminal of the LED array;
a fifth diode having an anode connected to the anode of the second diode and a cathode connected to the anode of the first diode;
a sixth diode having an anode connected to the cathode of the second diode and a cathode connected to the cathode of the first diode;
a seventh diode having an anode connected to the cathode of the fourth diode and a cathode connected to the cathode of the third diode; and
an eighth diode having an anode connected to the anode of the fourth diode and a cathode connected to the anode of the third diode.

9. A Light Emitting Diode (LED) lamp, comprising:
four external connection pins comprising at least two connection pins connected to a ballast stabilizer for a fluorescent lamp;
an LED array in which a plurality of LEDs are connected in series;
at least one capacitor unit formed between the LED array and the external connection pin and having capacitance of 10-100 μF; and
at least one capacitor unit comprises a pair of polarized capacitors connected with a back-to-back method.

10. The LED lamp of claim 9, wherein the at least one capacitor unit comprises at least one non-polar capacitor.

11. The LED lamp of claim 9, wherein the at least one capacitor unit comprises:
a first capacitor unit having one end connected to a first connection pin and the other end connected to an anode terminal of the LED array;
a second capacitor unit having one end connected to a second connection pin and the other end connected to a cathode terminal of the LED array;
a third capacitor unit having one end connected to a third connection pin and the other end connected to an anode terminal of the LED array; and
a fourth capacitor unit having one end connected to a fourth connection pin and the other end connected to a cathode terminal of the LED array.

* * * * *